United States Patent [19]

Barr

[11] 4,178,525
[45] Dec. 11, 1979

[54] TWO WIRE PIEZOELECTRIC ACCELERATION TRANSMITTER

[75] Inventor: Kenneth W. Barr, Brea, Calif.

[73] Assignee: Robertshaw Controls Company, Richmond, Va.

[21] Appl. No.: 878,739

[22] Filed: Feb. 17, 1978

[51] Int. Cl.² .............................................. H01L 41/10
[52] U.S. Cl. ..................................... 310/319; 310/329
[58] Field of Search ................. 310/319, 329; 73/570, 73/649, 654, 658, 666, 530, 511, 514, 517 R, 517 AV, 518, 492, 497, 503; 340/15, 17 R, 261, 262

[56] References Cited

U.S. PATENT DOCUMENTS

| Re. 28,596 | 10/1975 | Siegel | 310/319 |
|---|---|---|---|
| 3,213,197 | 10/1965 | Hawkins | 73/517 R |
| 3,390,286 | 6/1968 | Gradin et al. | 310/319 X |
| 3,455,148 | 7/1969 | Foster et al. | 73/517 R |
| 3,455,149 | 7/1969 | Foster et al. | 73/517 R |
| 3,749,946 | 7/1973 | Rüti | 310/319 |
| 4,085,349 | 4/1978 | Farstad | 310/319 |

*Primary Examiner*—Mark O. Budd
*Attorney, Agent, or Firm*—Fulwider, Patton, Rieber, Lee & Utecht

[57] ABSTRACT

There is disclosed a transmitter for detecting and transmitting peak amplitudes of a cyclic voltage developed by a transducer responsive to vibration. The transmitter includes an input amplifier receiving the transducer output signal in circuit to a voltage peak detector which generates a voltage signal responsive to the peak of the amplified transducer signal, a voltage peak integrator which develops an analog output voltage signal responsive to a predetermined, stored number of pulses of the pulse voltage signal and output amplifier which generates an output current signal proportional to the summed pulses of the voltage signal. The transmitter operates at a steady current drain of a few milliamperes and develops an output current signal in the 4-20 milliampere range whereby it can be directly coupled to most electrical instrumentation. The vibration transducer which is employed is preferably a piezoelectric crystal having an integrated preamplifier circuit which is powered by a constant current source supply included in the transmitter circuits.

9 Claims, 4 Drawing Figures

TWO WIRE PIEZOELECTRIC ACCELERATION TRANSMITTER

BACKGROUND OF THE INVENTION

1. Field of the Invention

This invention relates to a two wire transmitter and, in particular, to an acceleration transmitter for developing and transmitting an analog current signal in response to a cyclic voltage input from a vibration sensor such as a piezoelectric device.

2. Brief Statement of the Prior Art

Transmitters which have been used previously with piezoelectric devices to transmit signals proportional to the cyclic output of such devices have commonly been located at some distance from the vibration sensing device. Since the output of such devices is a relatively weak signal, it has been necessary to interconnect the transmitter with the sensing device with a high capacitance, low noise, shielded cable. Even when such precautions are taken, disruptions or movements of the cable frequently generate spurious signals and interfere with a precise detection of the output of the vibration sensing device.

BRIEF STATEMENT OF THE INVENTION

This invention comprises a two wire transmitter for remote installation on a vibration sensing device. The transmitter includes a single integrated circuit which provides the functioning elements for a constant voltage source to drive the circuit and the vibration transducer, and input signal amplifier, a peak detection and summation circuit and an output amplifier to produce an analog current signal, proportional to the amplitude of the input signal. The circuit is provided with range and zero adjustment means and the circuit components are selected to provide a null or quiescent steady current drain of about four milliamps with a full scale circuit drain of about 20 milliamps, whereby the output of the transmitter is directly compatible with present electrical instrumentation.

BRIEF DESCRIPTION OF THE DRAWINGS

The invention will be described with reference to the Figures of which.

DESCRIPTION OF THE PREFERRED EMBODIMENT

Figure 1:
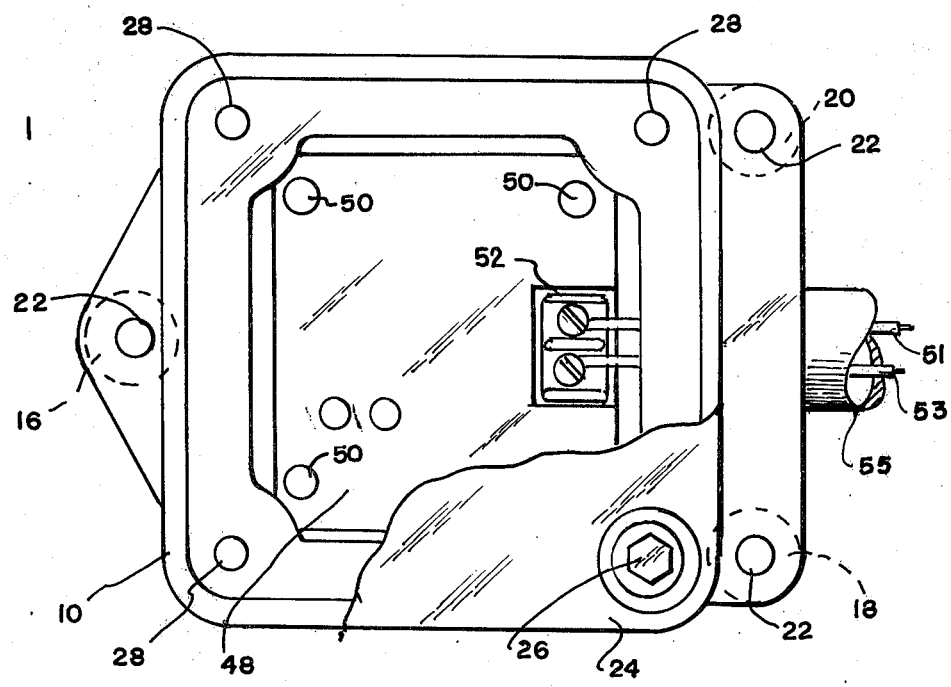
FIGS. 1 and 2 illustrates the transducer and transmitter assembly.
Figure 2:
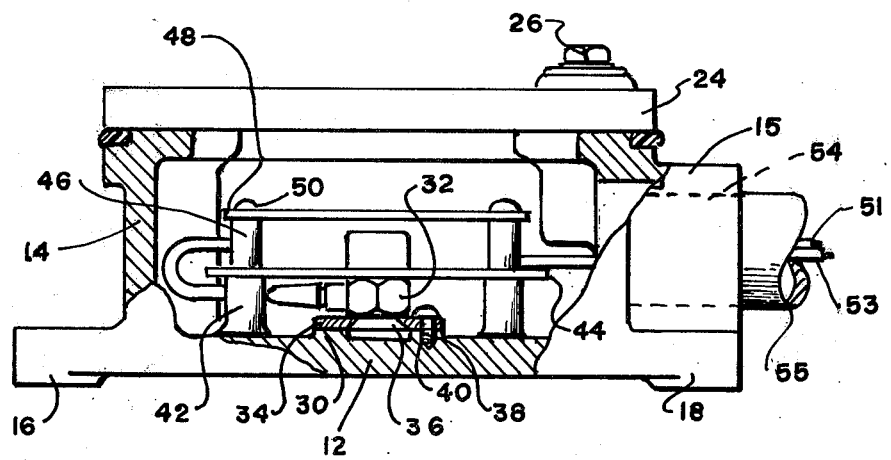

Referring now to FIGS. 1 and 2, the transducer and transmitter assembly is contained within a housing 10 having a base plate 12 and integral side walls such as wall 14. The base plate has three mounting feet 16, 18 and 20 disposed as shown in FIG. 2 to provide a three point support of the assembly. The base is provided with bores 22 for receiving screws, machine bolts and the like for securing the assembly to the vibrating device under study.

The housing 10 is closed with a cover plate 24 that is secured by machine screws 26 that extend through bores in the corners of the cover plate and are received in threaded bores 28 in the side walls of the housing 10.

Centrally located on the inside surface of bottom wall 12 is a boss 30 that provides a seat for the accelerometer 32. The latter is a commercially obtainable item available from Bolt, Beranek and Newman, Inc. and includes a piezoelectric crystal which is coupled to an internal preamplifier to generate a voltage signal of oscillating amplitude in response to vibrations experienced by base plate 12. The accelerometer 32 is secured to a mounting base 34 by screw 36 and the mounting base is secured to the boss 30 by three machine screws 38 that are received in internally threaded bores 40.

The inside surface of bottom wall 12 of the housing also bears a plurality of upright posts such as post 42 which provide a mounting support for the printed circuit board 44 which carries the transmitter circuit described in greater detail hereinafter with reference to FIG. 4. A plurality of spacers such as 46 are positioned on the printed circuit board and support a cover plate 48. The assembly of cover plate 48, spacers 46 and circuit board 44 is secured by a plurality of machine screws 50 which extend coextensively through these members and into threaded bores in the upright post 42. The printed circuit board 44 bears a pair of terminal connector blocks 52 which are accessible through cover plate 48 as shown in FIG. 1. The two connecting leads 51 and 53 for the instrument are extended through a conduit 55 which is received in internally threaded bore 54 in upright wall 15 for attachment to the contactor terminals 52.

Figure 3:
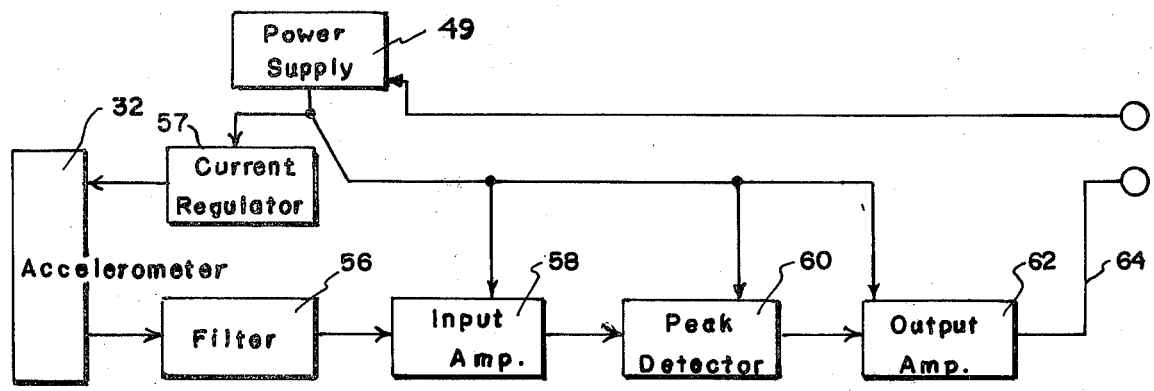
FIG. 3 is a system diagram.

Referring now to FIG. 3, the transmitter circuit of the invention will be described. The system block diagram of FIG. 3 illustrates the basic circuit components. These components include a power supply 49 which provides a constant regulated voltage to the circuit components. A constant current regulator circuit 57 is provided to supply a constant current to the preamplifier circuit in the accelerometer assembly 32. The oscillating voltage output of the accelerometer 32 is applied through a passive filter circuit 56 to the input amplifier 58 which preferably is of adjustable gain to provide a variable span to the instrument assembly. The amplified oscillating voltage signal is applied to a peak detecting circuit 60 which detects and sums the voltage peaks and generates a pulsed voltage signal responsive thereto which is applied to an output amplifier 62 that generates an amplified current signal proportional to the amplitude of the signal received from the peak detecting circuit 60. The output current signal in conductor 64 is detected with a conventional current detecting meter.

Figure 4:
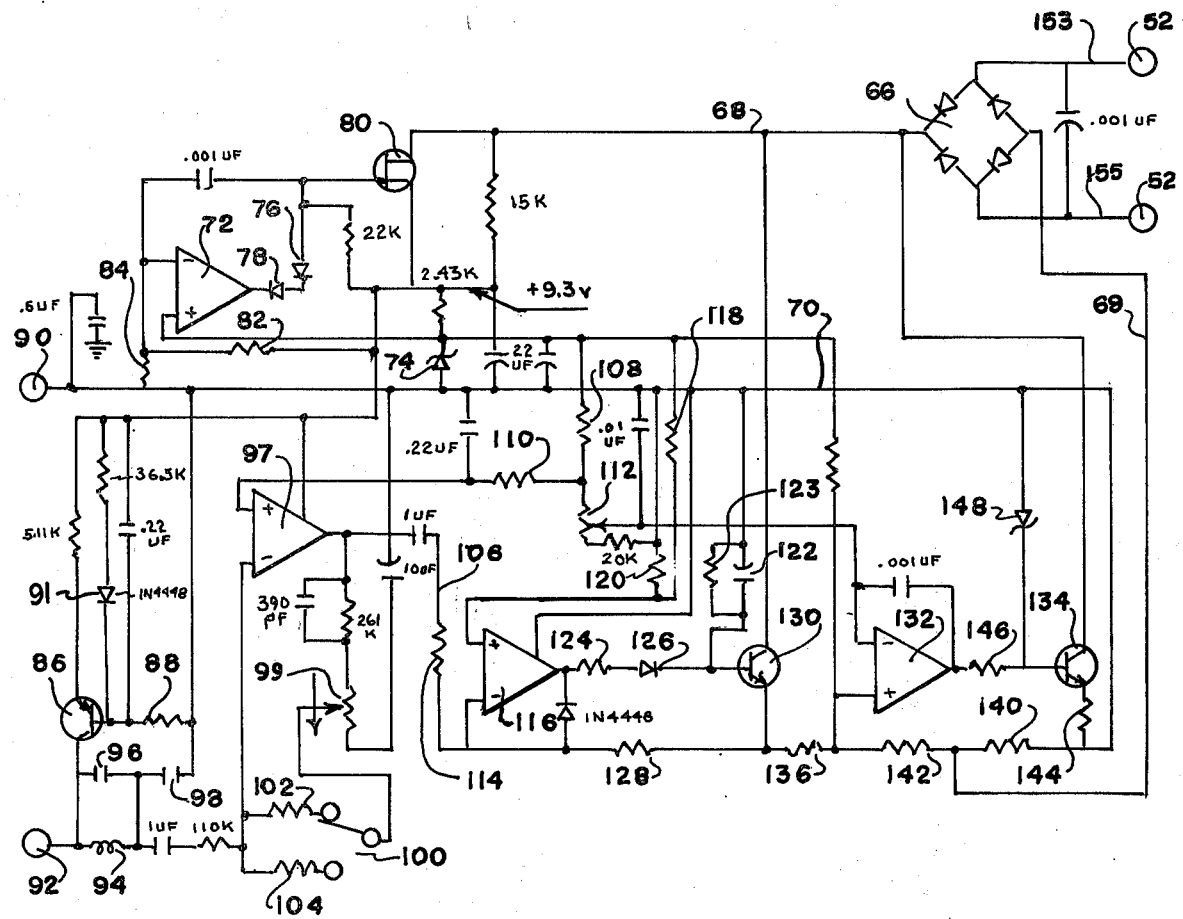
FIG. 4 is an electrical circuit schematic of the transmitter circuit.

Referring now to FIG. 4, the components of the aforementioned circuits will be described in greater detail. As there illustrated, the connector terminals 52 are linked through a diode bridge 66 to busses 68 and 69.

The power supply 49 comprises operational amplifier 72 which receives a constant, regulated voltage of 6.4 volts at its noninverting terminal from zener diode 74. The amplifier output is connected through a pair of diodes 76 and 78 to the input terminal of FET transistor 80 which develops approximately 9.3 constant voltage relative to common buss 70. The voltage is maintained at a constant regulated value by the feedback circuit through a voltage divider formed by resistors 82 and 84 to the inverting terminal of operational amplifier 72.

The constant current generator circuit 57 comprises transistor 86 which receives a constant bias voltage through resistor 88. Diode 91 in the bias circuit for transistor 86 provides temperature compensation in the base emitter voltage.

The accelerometer transducer is connected across terminals 90 and 92 and the oscillating voltage signal is processed through the passive filter network 56 which is an M-derived filter formed of coil 94 in parallel circuit to capacitor 96 and in circuit to capacitor 98. The M-derived filter is preferred for this application because it provides a very sharp cut-off and uniform attentuation of the pass frequency band. The filter is used as a low pass filter to pass frequencies below approximately 1,000 Hz, thereby isolating any resonant frequencies of the transducer assembly. The particular filter was selected with a cut-off frequency near one KHz and a maximum rejection frequency near 1.8 KHz to filter the resonance frequencies experienced with the particular embodiment.

The filtered signal is applied to an AC coupled amplifier utilizing operational amplifier 97 having a feedback circuit that includes variable resistor 99 for adjustment of the range of deflection of the meter and switch 100 and resistances 102 and 104 which provide range adjustment capability such that the amplifier gain can be adjusted by factors of 2 and 5 by switching between resistances 102 and 104. The adjustment capability of variable resistor 99 permits compensation for transducers which depart from the nominal 10 MV/G sensitivity by plus or minus ten percent.

The output of amplifier 97 is biased up by the voltage applied to the noninverting terminal of amplifier 97 through the voltage divider formed by resistances 108, 110 and 112.

The amplified signal from amplifier 97 is fed through line 106 and resistance 114 to the inverting terminal of amplifier 116. Amplifier 116 receives a reference voltage from the voltage divider formed by 118 and 120. When no signal is received, the output of amplifier 116 moves positively, charging capacitor 122 through resistance 124 and diode 126 until the feedback voltage through resistance 128 equals the reference voltage supplied to the non-inverting terminal of amplifier 116. When a signal is received through conductor 106, the negative peaks of the signal cause the inverting terminal of the amplifier to move negative with respect to the noninverting terminal, resulting in a position pulse at the amplifier output. This positive pulse increases the positive voltage on capacitor 122 which is charged at a rate determined by the amplitude and frequency of the pulse and the value of resistor 125. The charge on capacitor 122 decays through resistor 123 which is sized to provide a decay rate sufficient to eliminate an output signal promptly when the sensed vibration ceases. As capacitor 122 is charged, its voltage causes the output of transistor 130 to move positive until the voltage division between the emitter of transistor 130 and the negative peak from the voltage divider of resistance 114 and 128 no longer causes the inverting terminal of amplifier 116 to go more negative than the non-inverting terminal. This will occur when the output of the amplifier has gone positive by twice the amount of a negative peak.

The output amplifier comprises the operational amplifier 132 and transistor 134. The input signal is applied to resistance 136 from transistor 130. The total current in the negative common buss 70 flows through resistance 140 which develops a minimum voltage at the null current flow (about four milliamperes) and a maximum voltage at the maximum deflection current (about 20 MA). The feedback voltage is applied to resistance 142 which is connected to the non-inverting terminal of amplifier 132 which controls the current through transistor 134, resistance 144 and resistance 140 such that the voltage drop across resistance 140 balances the input voltage to amplifier 132.

Resistance 112 provides a variable reference voltage which is applied to the inverting terminal of amplifier 132, thereby permitting zero adjustment of the instrument. Resistance 146, zenner diode 148 and resistance 144 form a circuit which limits the total current of the circuit to a maximum value, preferably to less than 28 MA.

The output terminals 52 of the transmitter circuit are coupled to diode bridge 66 by leads 153 and 155. The diode bridge 66 is connected to the negative buss 69 and to the positive buss 68. The diode bridge is employed to insure that the terminals 52 cannot be improperly connected to the power supply and output circuits.

The operational amplifiers employed in the circuit are a single, four-function, integrated circuit and are all connected to a common bus 70. The entire circuit is designed to operate on a null deflection current of about 4 milliamperes with a full deflection current of approximately 20 milliamperes. This range of output current response is compatible with conventional instrumentation.

The following table summarizes the values of the components employed in a preferred embodiment of the invention:

| Element No. | Description | Value or Designation |
|---|---|---|
| 66 | Diode bridge | W06 |
| 72 | Operational amplifier | 1C1A-LM-124J |
| 74 | Zener diode | 1N 4572 |
| 76 | Diode | 1N 4148 |
| 78 | Diode | 1N 4148 |
| 80 | FET | 2N4093 |
| 82 | Resistor | 49.9 K |
| 84 | Resistor | 110 K |
| 86 | Transistor | 2N4250 |
| 88 | Resistor | 100 K |
| 91 | Diode | 1N448 |
| 94 | Coil | 100 m H |
| 96 | Capacitor | 1.1 µF, 100 v |
| 97 | Operational amplifier | 1C1B-LM124J |
| 98 | Capacitor | 0.1 µF, 100 v |
| 99 | Potentiometer | 5 K |
| 102 | Resistor | 261 K |
| 104 | Resistor | 95.3K |
| 114 | Resistor | 100 K |
| 116 | Operational amplifier | 1C1D-LM124J |
| 118 | Resistor | 402 K |
| 120 | Resistor | 402 K |
| 122 | Capacitor | 10 µF |
| 123 | Resistor | 2.2 Megaohms |
| 124 | Resistor | 6.8K |
| 126 | Diode | 1N 4448 |
| 128 | Resistor | 200 K |
| 130 | Transistor | 2N5962 |
| 132 | Operational amplifier | 1C1C-LM 124J |
| 134 | Transistor | 2N 2270 |
| 136 | Resistor | 200 K |
| 140 | Resistor | 83.4 ohms |
| 142 | Resistor | 100 K |
| 144 | Resistor | 267 ohms |
| 146 | Resistor | 2 K |
| 148 | Zener diode | 1N 753 |

Compatible values for other circuit elements are shown on FIG. 4.

The invention has been described with reference to the presently preferred and illustrated embodiment. It is not intended that the invention be unduly limited by this disclosure of the presently preferred embodiment. Instead, it is intended that the invention be defined by the means and their obvious equivalents set forth in the following claims.

What is claimed is:

1. A device for detecting and transmitting peak amplitudes of mechanical vibration which comprises:
   (a) a piezoelectric crystal mechanical vibration to electrical voltage transducer and voltage preamplifier means;
   (b) a constant current generator to drive said preamplifier means;
   (c) adjustable gain input amplifier means in circuit to receive the cyclic voltage signal from said transducer and generate an amplified signal therefrom;
   (d) voltage peak detector means in circuit to receive said amplified signal and to generate a pulsed voltage signal responsive to the peaks of said amplified signal;
   (e) voltage peak summation means operatively connected to said peak detector means and to develop an analog output voltage signal responsive thereto after receipt and storage of a predetermined number of pulses of said pulsed voltage signal; and
   (f) output amplifier means operatively connected to said summation means to generate an output current signal proportional to said summed pulses of said voltage signal.

2. The transmitter of claim 1 including constant voltage regulation means to supply said input and output amplifier means and said voltage peak detection means.

3. The transmitter of claim 2 including low frequency band pass filter means at the input terminals to said input amplifier means.

4. The transmitter of claim 1 wherein said output amplifier means includes variable reference voltage input means to permit fixed adjustability of the zero or null of said output signal.

5. The transmitter of claim 1 wherein said input amplifier means includes adjustable gain means whereby the span of said transmitter is fixedly adjustable.

6. A two wire transmitter for detecting and transmitting peak amplitudes of a cyclic voltage output transducer which comprises:
   (a) adjustable gain input amplifier means in circuit with low frequency band pass filter means to receive filtered cyclic voltage signal from said transducer and generate an amplified signal therefrom;
   (b) voltage peak detector means in circuit to receive said amplified signal and to generate a pulsed voltage signal response to the peaks of said amplified signal;
   (c) voltage peak summation means operatively connected to said peak detector means and to develop an analog output voltage signal responsive thereto after receipt and storage of a predetermined number of pulses of said pulsed voltage signal;
   (d) output amplifier means operatively connected to said summation means to generate an output current signal proportional to said summed pulses of said voltage signal; and
   (e) constant voltage regulation means to supply said input and output amplifier means and said voltage peak detection means.

7. A two wire device for sensing the amplitude of vibration comprising the assembly of a housing containing:
   (a) first and second conductors as the only connection means to remote, external electrical power and measurement means;
   (b) piezoelectric crystal transducer means responsive to vibration in circuit to voltage peak amplifier and summation means;
   (c) output amplifier means comprising operational amplifier means with its non-inverting terminal in circuit with said summation means and its output in circuit to drive transistor amplifier means in circuit across said first and second conductors through resistive means, feedback voltage means in circuit from said resistive means to said non-inverting terminal of said operational amplifier; and
   (d) voltage regulation means in circuit with said conductors and said voltage peak amplifier and summation means and said output amplifier means to provide a constant voltage supply thereto; whereby the current flow through said first and second conductors is proportional to the amplitude of said vibration.

8. The device of claim 7 wherein said piezoelectric crystal transducer includes preamplifier means and said device also includes a constant current generator to drive said preamplifier means.

9. The device of claim 7 also including variable reference voltage input means to said operational amplifier of said output amplifier means to permit fixed adjustability of the zero or null of said output signal.

* * * * *